(12) United States Patent
Kottapalli et al.

(10) Patent No.: US 8,656,115 B2
(45) Date of Patent: Feb. 18, 2014

(54) EXTENDING A CACHE COHERENCY SNOOP BROADCAST PROTOCOL WITH DIRECTORY INFORMATION

(75) Inventors: Sailesh Kottapalli, San Jose, CA (US); Henk G. Neefs, Palo Alto, CA (US); Rahul Pal, Bangalore (IN); Manoj K. Arora, Bangalore (IN); Dheemanth Nagaraj, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 749 days.

(21) Appl. No.: 12/860,340

(22) Filed: Aug. 20, 2010

(65) Prior Publication Data
US 2012/0047333 A1 Feb. 23, 2012

(51) Int. Cl.
*G06F 12/00* (2006.01)
*G06F 13/00* (2006.01)

(52) U.S. Cl.
USPC ............ 711/146; 711/100; 711/118; 711/154

(58) Field of Classification Search
USPC .......... 711/100, 117, 118, 141, 146, 154, 200
See application file for complete search history.

(56) References Cited

U.S. PATENT DOCUMENTS

| | | | |
|---|---|---|---|
| 6,009,488 A | 12/1999 | Kavipurapu | |
| 6,349,368 B1 * | 2/2002 | Arimilli et al. | 711/144 |
| 7,249,224 B2 | 7/2007 | Glasco | |
| 7,962,696 B2 * | 6/2011 | Steely et al. | 711/145 |
| 2007/0156972 A1 | 7/2007 | Uehara et al. | |
| 2007/0294481 A1 | 12/2007 | Hoover et al. | |

OTHER PUBLICATIONS

Intel, An Introduction to the Intel® QuickPath Interconnect, © Jan. 2009, 22 pages.
U.S. Appl. No. 12/492,280, filed Jun. 26, 2009, currently pending.
Patent Cooperation Treaty, Notification of Transmittal of the International Search Report and the Written Opinion, mailed on Apr. 6, 2012 in International application No. PCT/US2011/046499.

* cited by examiner

*Primary Examiner* — Tuan Thai
(74) *Attorney, Agent, or Firm* — Trop, Pruner & Hu, P.C.

(57) ABSTRACT

In one embodiment, a method includes receiving a read request from a first caching agent, determining whether a directory entry associated with the memory location indicates that the information is not present in a remote caching agent, and if so, transmitting the information from the memory location to the first caching agent before snoop processing with respect to the read request is completed. Other embodiments are described and claimed.

20 Claims, 7 Drawing Sheets

| Current Directory State | Requester Node Type | Request Type | Dir Write | New Dir State | |
|---|---|---|---|---|---|
| Idle | L | G0/G1 | N | Idle | 410 |
| Idle | R | G0/G1 | Y | R-Own | 420 |
| R-Own | L | G0 | N | R-Own | 430 |
| R-Own | L | G1 | Y | Idle | 440 |
| R-Own | R | G0/G1 | N | R-Own | 450 |

FIG. 6

EXTENDING A CACHE COHERENCY SNOOP BROADCAST PROTOCOL WITH DIRECTORY INFORMATION

BACKGROUND

Modern computer systems are generally formed of numerous components that are coupled together to interoperate and perform various processing functions under control of a central processor, commonly referred to as a central processing unit (CPU). Most systems typically include a collection of semiconductor devices including processors, peripheral devices, dedicated processing units and so forth, in addition to additional semiconductor devices that act as a system memory to provide storage for information used by the processing units. In many systems, multiple memories are present, each of which can be associated with a given processor that thus acts as local memory for the corresponding processor. However, data located in a memory associated with a first processor may need to be accessed by another processor.

To maintain the coherency of data across the system, a cache coherency protocol such as a directory-based protocol or a snoop broadcast-based protocol may be implemented in a system. In a directory-based cache coherence protocol, agents that guard the memory, often referred to as home agents (HAs), collectively maintain a directory that tracks where and in what state each cacheline is cached in the system. A caching agent (CA) that seeks to acquire a cacheline sends a request to a HA, which looks up the directory and sends messages, commonly referred to as snoops, to only those CAs which the directory indicates may have cached copies of the line. However this lookup can increase latency, as the home agent does not launch the snoop until the directory lookup is completed.

Instead in a broadcast protocol, typically no directory exists and a CA or HA broadcasts a snoop to all peer caching agents. This type of protocol can improve latency where one of the caching agents has the most recent copy of the requested data. However, there can be higher latencies when the data is obtained from memory if the snoop latency is longer than memory fetch latency, as in this case the data is held until all snoop responses have been received and processed by the HA. That is, return of data from memory is held until snoop responses from all agents are received.

BRIEF DESCRIPTION OF THE DRAWINGS

FIG. 6 is a block diagram of a portion of a directory in accordance with another embodiment of the present invention.

DETAILED DESCRIPTION

In various embodiments, a snoop broadcast protocol-based system can be implemented that further includes a directory to enable reduced latencies, particularly where data is present locally with respect to a requester. That is, in various embodiments a snoop broadcast protocol may be implemented in addition to directory information such that when it can be determined based on the directory information that requested data is not present in a remote node, a memory request associated with the snoop, e.g., a read request, can be serviced and requested data returned, prior to completion of snoop processing.

In general, for a snoop broadcast protocol, responsive to a memory request, all peer caching agents that can have a copy of the line are probed with snoop requests that proceed in parallel with the memory request. In general, such a protocol may provide faster responses (e.g., lower latency) where a peer caching agent has the most recent copy of the line. As will be discussed further below, the snoop broadcast can be sent by the caching agent (a source snoop request), or by the home agent responsive to receipt of the read request from the caching agent. In general, a source snoop protocol may improve latency of cache-to-cache transfers, while a home-agent originated snoop protocol may allow pairing of the snoop broadcast with other home agent transactions. However, in a large system, coherence processing can take longer than a latency for fetching requested data from memory. Thus fetched information from memory may be held until all the responses are collected and as such, memory latency can be gated by a remote snoop response delay period, which can particularly impact local memory requests.

Instead in a system that implements a directory and a non-snoop broadcast based flow, a memory request is sent to the home agent, which looks up the directory to determine whether the requested cache line is present in a peer agent. If so, the peer agent is probed via a snoop request. If instead the directory information indicates no peer caching agent includes a copy of the requested data, the snoop request need not be sent. In this way, interconnect bandwidth can be reduced.

According to various embodiments, a hybrid of these two systems can be implemented. That is, a snoop broadcast-based protocol can be implemented that further leverages information present in a directory. While the scope of the present invention is not limited in this regard, the directory information may correspond to a minimal amount of information, e.g., stored in error correction coding (ECC) bits of memory entries corresponding to requested data. This system may be referred to as a directory assisted snoop (DAS) broadcast protocol. And thus based on minimal information present in a directory entry, a home agent can reduce latency associated with a memory request when it can be determined that no remote agent holds a copy of the requested data.

Figure 1:
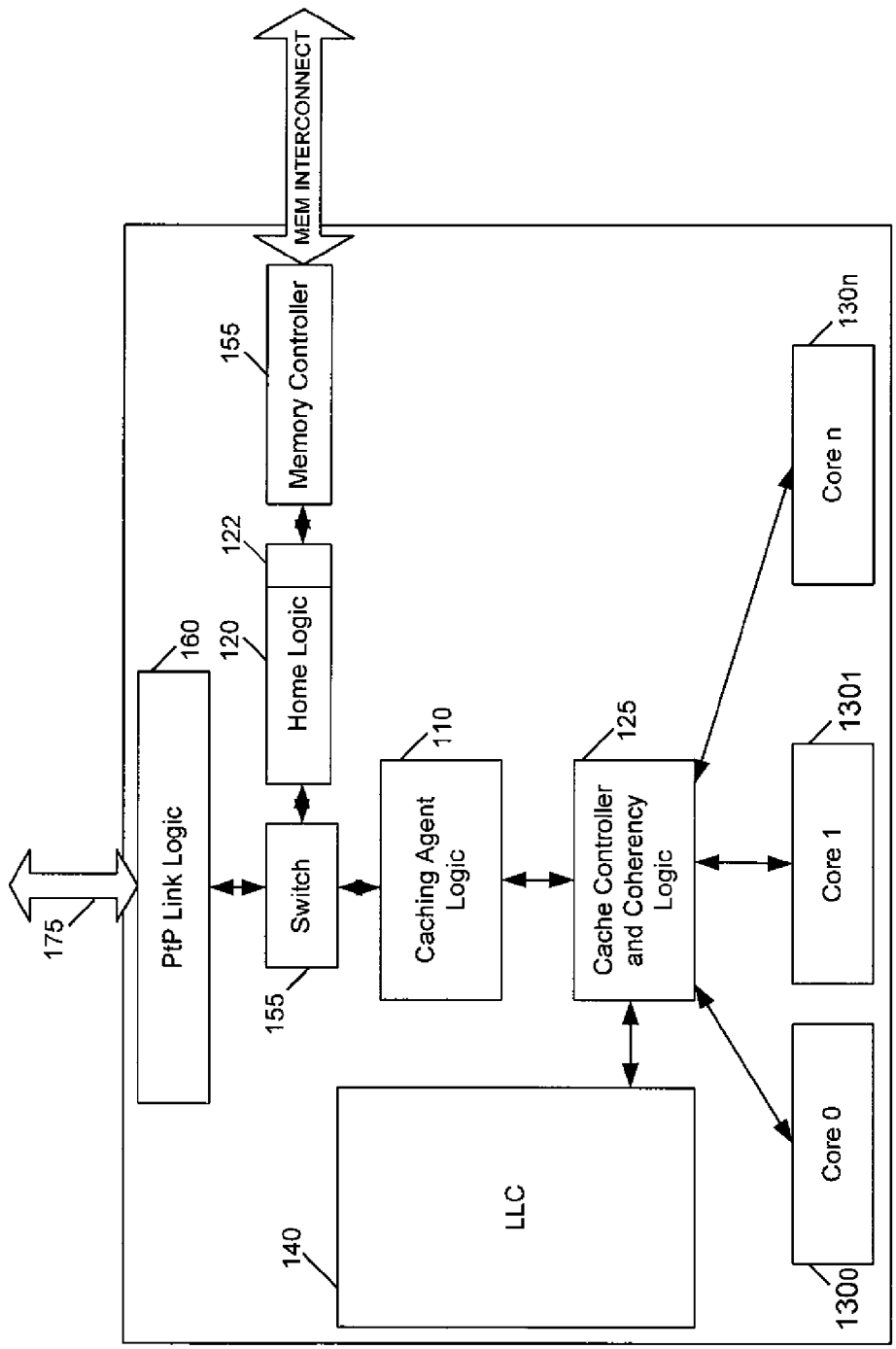
FIG. 1 is a block diagram of a processor in accordance with one embodiment of the present invention.

Referring now to FIG. 1, shown is a block diagram of a processor in accordance with one embodiment of the present invention. As shown in FIG. 1, processor 100 contains at least one caching agent logic 110 (referred to generally as a "caching agent") and one home logic 120 (referred to generally as a "home agent"). Note that the term "device" or "agent" is general and may be used to describe any electrical component coupled to a link. A "link" or "interconnect" is generally defined as an information-carrying medium that establishes a communication pathway for messages, namely information placed in a predetermined format. The link or interconnect may be a wired physical medium (e.g., a bus, one or more electrical wires, trace, cable, etc.) or a wireless medium (e.g., air in combination with wireless signaling technology).

According to one embodiment, the term "home agent" is used to denote an agent that represents a portion of a system memory, and may be broadly defined as a device that provides resources for a caching agent to access memory and, based on requests from the caching agents, resolve conflicts, maintain ordering and the like. As such, a home agent may be the designated owner of a portion of the memory and act as a final arbiter of the requests and coherence processing for the associated memory. The home agent includes a tracker 122 and data buffer(s) for each caching agent as described below. A "tracker" is a storage that may buffer requests associated with various agents. As discussed further below, the home agent may also include or be associated with one or more counters. According to one embodiment of the invention, a "caching agent" generally represents a cache logic that can request and cache copies of memory data (and modify the data). Such a caching agent may encompass a cache controller that is adapted to route memory requests to the home agent. In one embodiment, home agent 120 may support up to three caching agents, one caching agent for each of a plurality of cores 130 and one caching agent for an input/output hub (IOH) write cache (not shown in FIG. 1).

Cores 130 may be connected to a last level cache (LLC) 140 using an on-die interconnect and via a cache controller 125. The cache domain including the LLC and the core caches is encapsulated by caching agent logic 110 and cache controller 125. This logic will implement the underlying cache domains as a single caching agent to a cache coherence system. The home agent logic protecting the memory connected to a local memory controller 155 is implemented in home logic 120. Caching agent logic 110 and home agent logic 120 are connected to a link logic 160 using a switching logic 155. Link logic 160 may support one or more point-to-point (PtP) links 175. Link logic 160 may transmit broadcast-based snoops to other processors, e.g., according to a source snoop broadcast protocol or a home agent-based broadcast snoop protocol.

Figure 2:
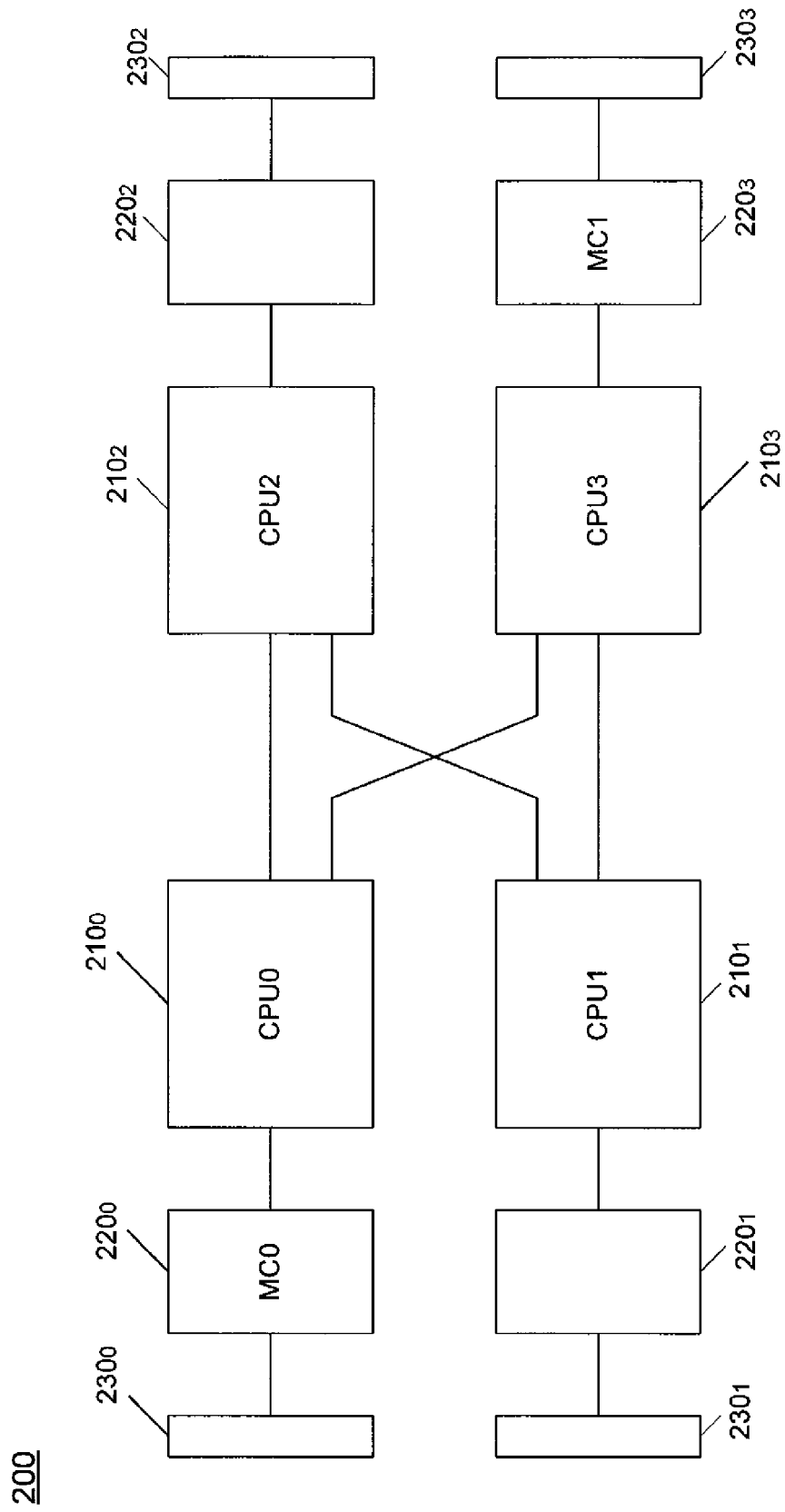
FIG. 2 is a block diagram of a system in accordance with one embodiment of the present invention.

Embodiments may be used in many different system types. In certain implementations, the hybrid handling of a broadcast-based snoop protocol that includes broadcast snoops in addition to directory information may be particularly appropriate for a system having a non-uniform memory architecture (NUMA). Referring now to FIG. 2, shown is a block diagram of a system in accordance with one embodiment of the present invention. As seen in FIG. 2, a system 200 includes a plurality of sockets $210_0$-$210_3$. Each socket may include a processor such as described above with regard to FIG. 1, although other implementations are certainly possible. Each socket may be coupled to the other sockets by way of a PtP link. In one embodiment, the PtP links may provide for communication in accordance with the Intel® Quick Path Interconnect (QPI) protocol. The QPI protocol is a cache coherent protocol that includes multiple layers including a physical layer, a link layer and a protocol layer. By using this protocol, coherent communications may be made in a system including multiple caching agents. The protocol provides for various communications over multiple channels and virtual networks along low latency links that provide for communication between devices coupled together via a PtP link. Of course, the scope of the present invention is not limited in this regard and in other embodiments, the PtP links may be in accordance with another communication protocol.

Still further, each socket may be coupled to a local portion of system memory, e.g., formed of a plurality of dual inline memory modules (DIMMs) that may include dynamic random access memory (DRAM). Specifically, as seen in FIG. 2, each socket 210 may be coupled to an associated memory controller $220_0$-$220_3$ which in turn may be coupled to a corresponding local portion of system memory $230_0$-$230_3$. Each socket may have a portion of system memory that is configured as local memory. Using embodiments of the present invention, when it can be determined based on directory information, e.g., stored in the corresponding local portion of system memory, that no copies of data of a request exist in remote nodes (e.g., one or more of the other sockets or other system components), the pending request, e.g., a read request can be directly fulfilled without waiting for completion of snoop processing.

Note that DAS-snoop-based coherence processing in accordance with an embodiment of the present invention can be controlled based on application utilization. That is, in some systems, this hybrid approach to broadcast and directory protocol systems can be used when a NUMA-type application is executing such that the majority of memory requests are to local memory. Instead, where it can be determined based on application utilization that a number of memory requests are targeted to remote nodes, a decision can be made to instead perform coherence processing according to, e.g., a pure snoop broadcast protocol. Note however, that even when this pure snoop broadcast flow without directory assist is occurring, the directory may be maintained consistent via update messages to the directory, in case directory assisted processing is to later occur.

In some embodiments counters may be associated with local memory requests and remote memory requests, and when a number of remote memory requests exceeds a certain threshold (e.g., by a predetermined percentage of total memory requests), the coherence processing may switch from a DAS snoop broadcast protocol to a pure snoop broadcast protocol or a pure directory protocol. With reference back to FIG. 1, each home agent may include a counter for its respective local memory portion to store a count of memory requests for the portion. Then, based on values of these counters, which can be indicative of whether a request pattern of an application is weighted towards local or remote memory requests, the home agents can perform coherence processing according to a selected one of a directory assisted snoop broadcast protocol and a non-directory assisted snoop broadcast protocol.

In one embodiment, memory $230_0$ may be a master and memory $230_3$ may be a slave, e.g., to store mirrored data. While shown in the embodiment of FIG. 2 as being separate memory controller components, in certain implementations the memory controller may be integrated within the sockets, such as shown for example in the processor socket of FIG. 1. An implementation such as shown in FIG. 2 thus may be for a socket glueless configuration, and which may implement mirroring. Data assigned with memory controller 220 (and memory $230_0$) can be mirrored to memory controller $230_3$ (and memory $230_3$) over the PtP links. Note however that mirroring is orthogonal to the directory assisted snoop protocol, which also can be implemented in a non-mirrored system.

Figure 3:
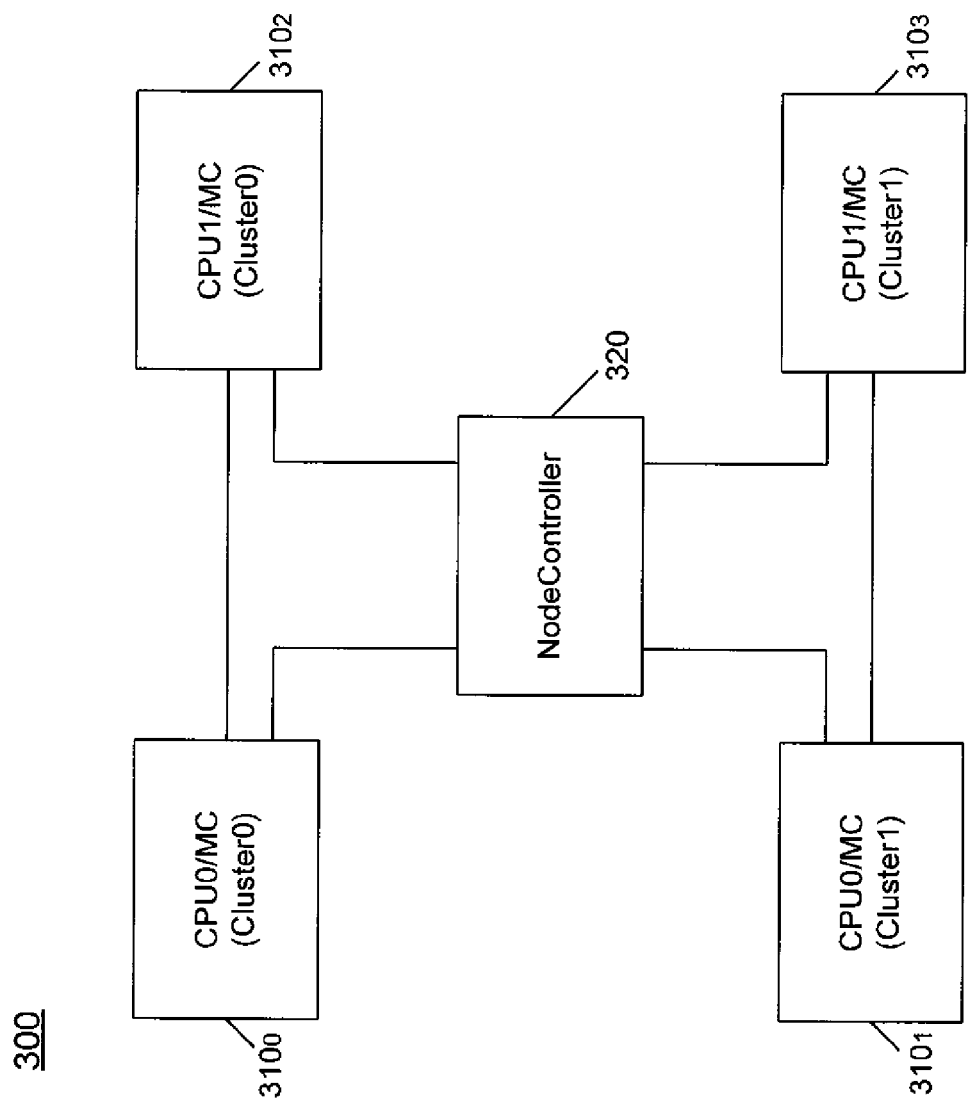
FIG. 3 is a block diagram of a clustered system in accordance with an embodiment of the present invention.

Another implementation in which embodiments may be used is shown in FIG. 3. In the embodiment of FIG. 3, a clustered system is provided. Specifically, system 300 includes a plurality of clusters $310_0$-$310_3$. Each cluster may include a corresponding processor, memory controller, and memory. In turn, each cluster may be coupled to a node controller (NC) 320. Thus, two socket clusters are connected via a node controller. As an example, data can be mirrored from cluster $310_0$ (Cluster0-CPU0) to cluster $310_3$ (Cluster 1-CPU 1).

In the implementation shown in FIG. 3, reduced latencies may occur when memory requests are made locally, e.g., within a cluster. In this way, when a local requester seeks access to local memory, requested information may be directly provided to the requester prior to completion of snoop processing. This memory latency may also inhere in situations where a remote read request is made and it can be determined based on the directory information that no remote node includes a copy of the requested data.

Figure 4:
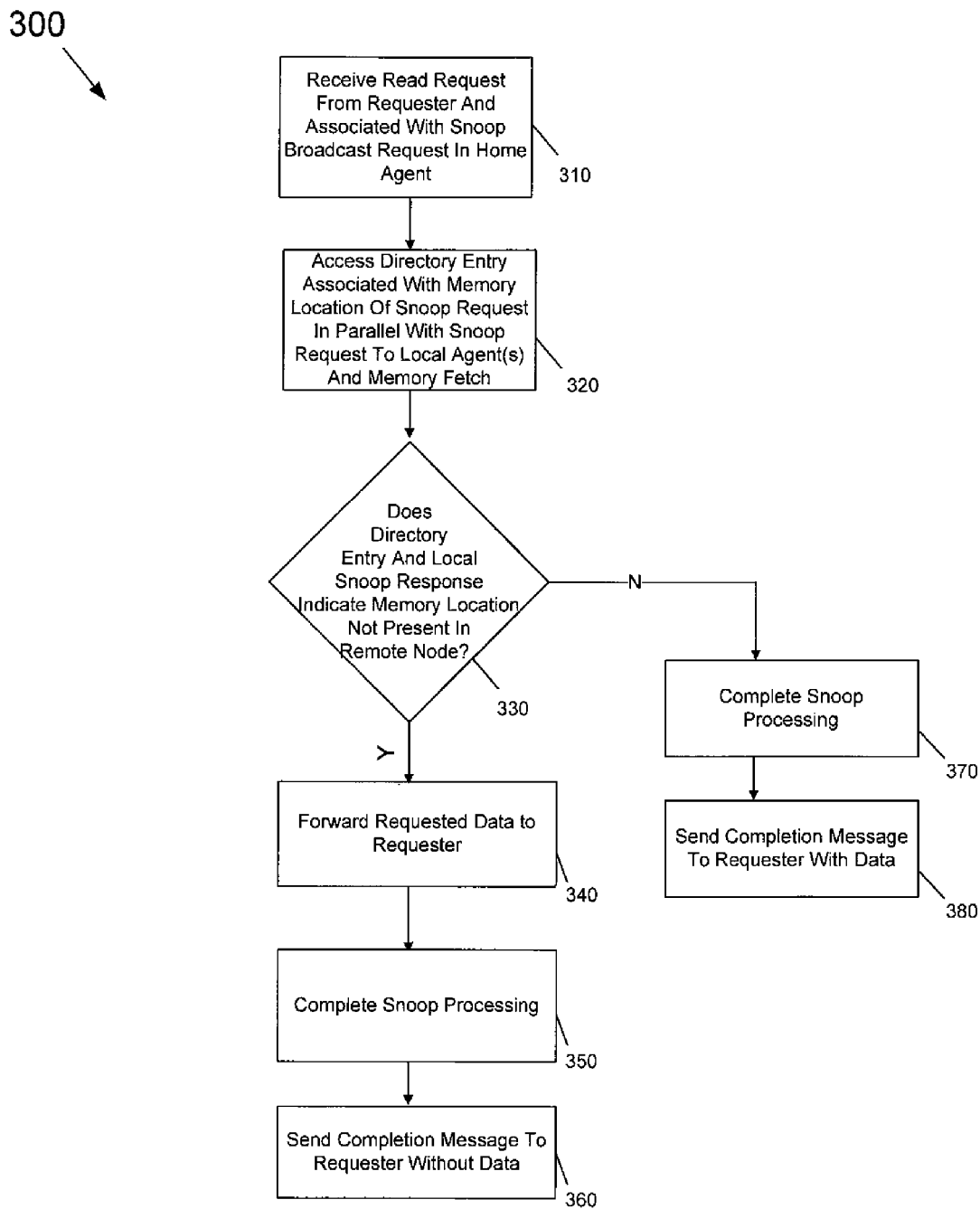
FIG. 4 is a flow diagram of a method in accordance with one embodiment of the present invention.

Referring now to FIG. 4, shown is a flow diagram of a method in accordance with one embodiment of the present invention. As shown in FIG. 4, method 300 may be implemented, e.g., using the home agent logic, which operates to detect an incoming request for a local memory and determine whether it is possible to fetch and provide requested data to the requester prior to completion of snoop processing As seen in FIG. 4, method 300 may begin by receiving a read request from a requester (block 310). Note that this read request may be received in various agents of the system and forwarded to the home agent associated with the memory location to be read. This read request may be associated with a snoop broadcast sent by the requester itself according to a source snoop broadcast protocol. Otherwise, the home agent may, responsive to receiving the read request, generate and send a snoop broadcast request to various system agents. In either event, a snoop broadcast thus is sent that is associated with the read request.

As further seen in FIG. 4, at block 320 the home agent may access a directory entry associated with the memory location of the snoop request. While in some embodiments the home agent may include or may be associated with a small cache memory that stores recently or frequently accessed directly entries, in many implementations this directory entry may correspond to in-memory information stored, e.g., in ECC or other available bits of a memory location. Note that this accessing of the directory entry may be in parallel with both a snoop request to the local agent(s) and fetching the data itself, since the directory entry may be part of the memory location itself. Note that while in the implementation of FIG. 4, the local snoop request to a local agent may occur in parallel, this need not be the case. Instead, such local snoop request may be performed in an implementation that is optimized for a NUMA-type system, where most memory requests will be to a local memory. In this way, as will be discussed further below, the need for storing information in the limited directory entry for agents local to a given node can be avoided. This both reduces the size of the directory entry, as well as memory interconnect bandwidth.

Still referring to FIG. 4, it may be determined whether based on information received, e.g., the directory entry and any local snoop responses, the requested memory location is not present in a remote node (diamond 330). That is, in many embodiments, the directory information may be used to indicate whether the data associated with the directory entry is present in a remote node of the system. As discussed above, in a particular optimization, the directory entry may not be able to indicate whether the data is present in a local agent. However for a local snoop response, there is minimal latency and thus this type of optimization may be appropriate, particularly for NUMA-based applications.

If it is determined that a copy of the location is not present in a remote node, control passes to block 340. At block 340, requested data may be forwarded to the requester. Sometime after this data transfer, snoop processing may be completed (block 350). That is, after the data has already been sent to the requester, various snoop processing to handle incoming snoop responses from different agents can be performed and completed. Finally, at block 360, a completion message may be sent to the requester. Note that this completion message is without data, as the data has been previously sent. Accordingly, the time between sending the data at block 340 and the sending of this completion message at block 360 may correspond to a reduced latency for handling this memory request. Note that the requester, upon receipt of the completion message, may perform various operations, e.g., clearing the request from a request queue or so forth.

Referring still to FIG. 4, if instead at diamond 330 it is determined that a copy of the requested information is present in a remote node, control passes instead to block 370, where snoop processing may be completed. Finally, at block 380 a completion message may be sent to the requester with data. Accordingly, this completion with data to the requester may occur at a later time than that performed in block 340 discussed above. While shown with this particular implementation in the embodiment of FIG. 4, understand the scope of the present invention is not limited in this regard.

Figure 5:
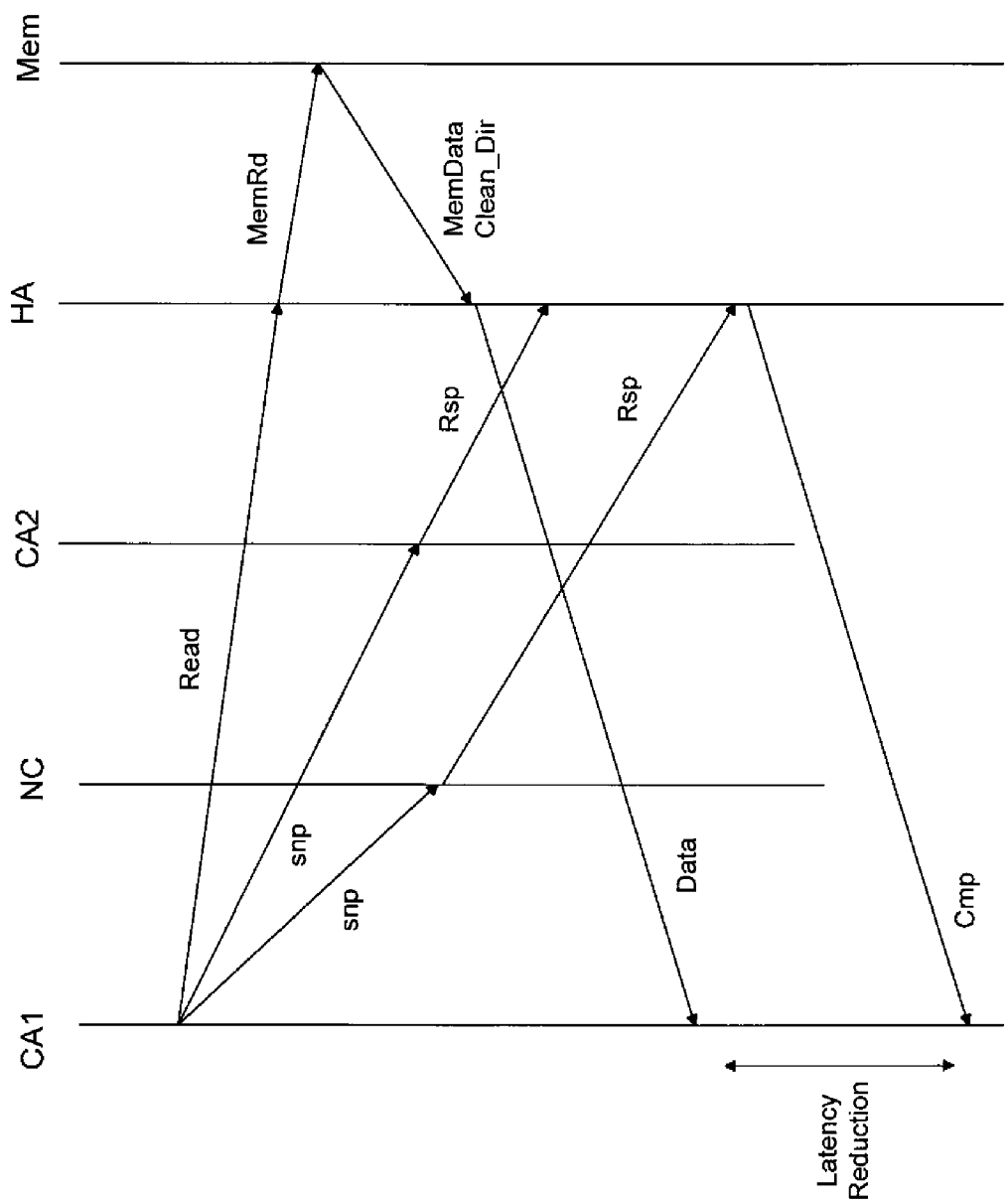
FIG. 5 is a flow diagram of operations performed according to an embodiment of the present invention.

Referring now to FIG. 5, shown is a diagram illustrating operations performed in handling a read request in accordance with an embodiment of the present invention. As shown in FIG. 5, multiple agents are present, namely multiple caching agents CA1 and CA2, a node controller (NC), a home agent (HA), and a memory (MEM). As seen, the transaction flow may begin by caching agent 1 issuing a read request. Note that in parallel with this read request, the caching agent also sends a snoop request, and thus the illustration shown in FIG. 5 is for a source snoop broadcast protocol. As seen, the snoop requests may be directed to other caching agents of the system, namely CA2 and NC, while the read request may be directed to the home agent.

Responsive to this read request, the home agent may perform a memory read (MemRd). Note that in addition to reading the requested data from a memory location, a corresponding directory entry, which may be one or more bits associated with the requested data and indicative of a presence of a copy of the data in a remote node, can also be accessed. As seen, the return of the memory fetch occurs such that the home agent receives the data (MemData) and an indication, namely by one or more bits of the directory entry, to indicate that the data is clean (Clean_Dir) which in this embodiment means that a copy of the data is not present in a remote node. While not shown in FIG. 5, understand that in addition to performing this memory read and directory read, in parallel the home agent may also snoop for copies of the data in a local node.

Thus because the directory information indicates that the data is clean, the home agent can directly send the data to the requester in a responsive data return (Data). As further seen after this time, the home agent may receive snoop responses (Rsp) from CA2 and NC. After processing these responses, which indicate that these agents do not have a copy of the requested data, the home agent may send a completion message (Cmp) to the requester. As seen, the time between the first caching agent's receipt of the data and later receipt of the completion message may correspond to a latency reduction in accordance with an embodiment of the present invention.

Note that while shown with this particular implementation in the embodiment of FIG. 5, the scope of the present invention is not limited in this regard. For example, assume that one of the responses from the peer caching agents indicates that the caching agent includes a copy of the requested data, e.g., in an exclusive or modified state. In this case, there is an inconsistency between the directory information and the snoop response information. Accordingly, a fault may be raised to enable and a handler to handle this coherence inconsistency, which may be an indication of an error, e.g., a single bit error with regard to at one of the memory locations at issue.

Referring now to FIG. 6, shown is an illustration of a plurality of transactions that can be performed in accordance with an embodiment of the present invention using an implementation with minimal directory writes to a directory. As seen, a plurality of transactions 410-450 is shown. For each transaction, a current directory state at the beginning of the transaction, a node type of the requester (e.g. local (L) or remote (R)), and request type (where a request type of G0 indicates the data request is without a request for unique ownership, e.g., a read only request for a shared copy of data, and a G1 request, which indicates a request for ownership (e.g. a RFO) to write to or otherwise modify a line). Still further, each transaction shows whether a directory write operation is to occur, in addition to a new state of the directory where such write operations do occur. By reducing the number of directory write operations, memory interconnect bandwidth can be reduced.

As seen, for a first transaction 410 issued by a local requester, with a current directory state of idle, meaning that a copy the data is not present in any remote node, regardless of request type, the state of the directory entry does not change and thus no directory write occurs. As to request 420 by a remote requester, regardless of the request type, a directory write does occur, and the new directory state is now remote-owned (R-Own) to indicate a copy of the data is present in a remote node. For a next local transaction 430, where the current directory state is R-Owned, when the request type is G0 (indicating data request is without a request for unique ownership), no directory write occurs. At transaction 440, a local request is received in which the current directory state is R-Owned, but here the request is a G1 type request seeking ownership. According, a directory write occurs, and the new directory state returns to Idle, indicating no remote copy of the data. Finally in a transaction 450 by a remote requester, where the current directory state is R-Own, regardless of the request type, no directory write occurs and the state of the directory entry is maintained.

Note that with regard to all of these transactions, a latency improvement in accordance with an embodiment of the present invention can be realized when the directory is in the idle state. Or, where copies exist in the shared state, a local or remote read request can also benefit from latency improvement.

Figure 7:
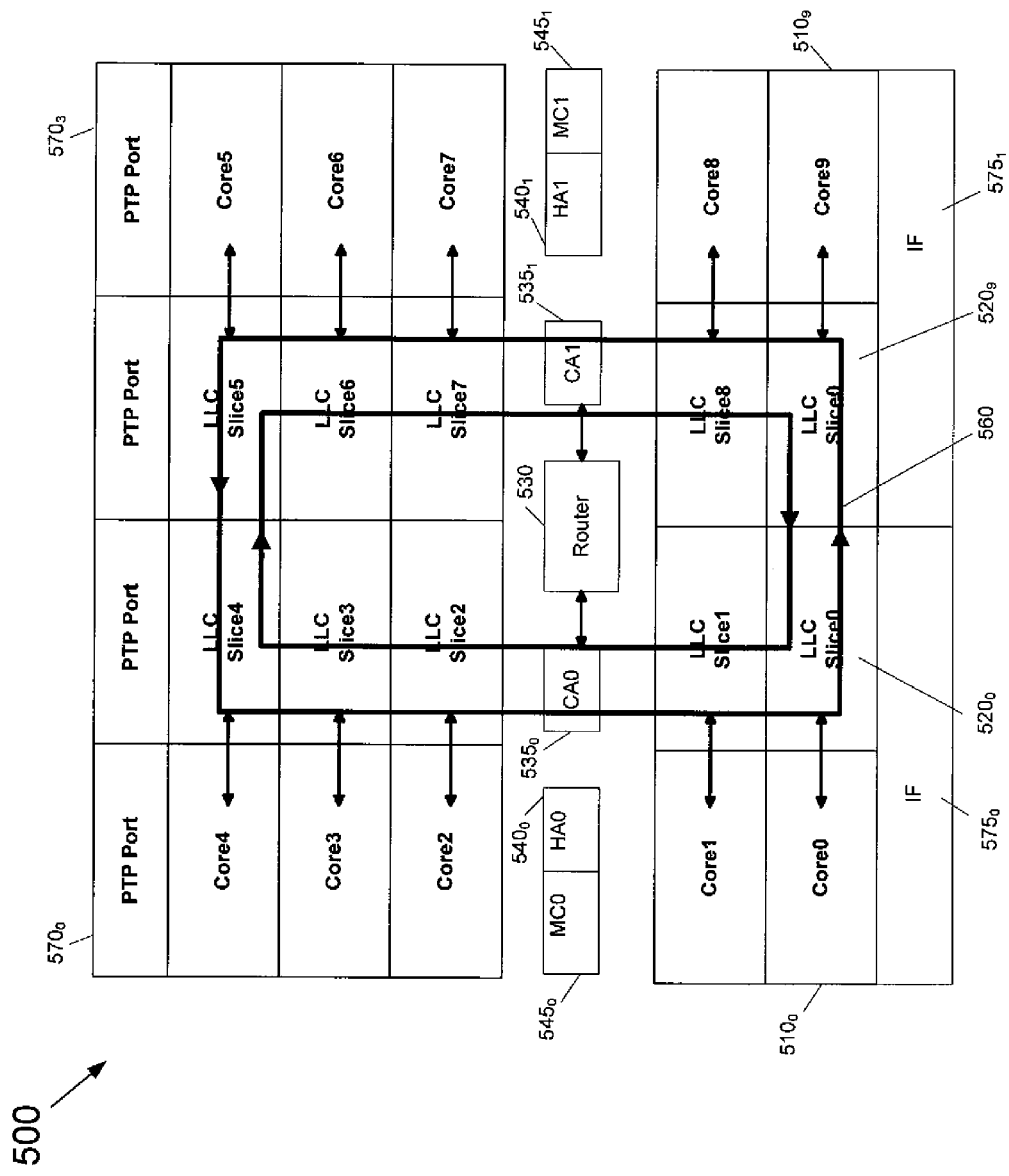
FIG. 7 is a block diagram of a processor in accordance with another embodiment of the present invention.

As discussed above, embodiments may be particularly appropriate to NUMA-based applications some which are becoming predominant workloads, particularly in server environments. Referring now to FIG. 7, shown is a block diagram of a processor in accordance with another embodiment of the present invention. Specifically, FIG. 7 shows a processor 500, which is a multi-core processor and may be particularly appropriate for server-based applications. As seen, processor 500 includes a plurality of cores $510_0$-$510_9$. While shown with a specific number of cores in the embodiment of FIG. 7, understand that the scope of the present invention is not limited in this regard. Each core may be associated with a private storage, e.g., one or more levels of cache memory. In addition, each core is shown as being coupled to a slice of a shared cache memory, e.g., a last level cache (LLC) that is formed of a plurality of slices $520_0$-$520_9$. As seen, communications via the different cores and caches may occur via a ring-based interconnect, which may be a bidirectional scalable ring interconnect 560. To provide off chip communications, a variety of different ports and agents may be present. Specifically as seen, a plurality of PtP ports $570_0$-$570_3$ may be present, in addition to other input output (I/O) ports $575_0$-$575_1$.

Still further, to provide improved memory latency particularly for NUMA applications, embodiments may provide a cache coherence protocol using various agents of the processor. Specifically as seen, a router 530 couples to a pair of caching agents $535_0$-$535_1$. These caching agents, which may represent an assortment of the cores on die, may couple to corresponding home agents $540_0$-$540_1$, and in turn may communicate with corresponding memory controllers $545_0$-$545_1$. In turn, these memory controllers may be coupled, e.g., via an off-chip memory interconnect to local portions of a system memory, e.g., one or more DRAMs coupled to the processor. Note that the off-chip memory may include directory entries in accordance with an embodiment of the present invention, such as shown in FIG. 6. In some embodiments, each of the home agents may further include small storage portions, e.g., caches to store particularly hot directory information for a small number of directory entries that are frequently or more recently accessed. While shown with this particular implementation in the embodiment of FIG. 7, understand the scope of the present invention is not limited in this regard.

Embodiments may be implemented in code and may be stored on a storage medium having stored thereon instructions which can be used to program a system to perform the instructions. The storage medium may include, but is not limited to, any type of non-transitory storage medium such as disk including floppy disks, optical disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   receiving, in a home agent of a system having a snoop broadcast protocol, a read request from a first caching agent, the read request for information stored at a memory location of a system memory associated with the home agent;
   determining whether a directory entry associated with the memory location indicates that the information is not present in a remote caching agent of the system; and
   if so, transmitting the information from the memory location of the system memory to the first caching agent before snoop processing with respect to the read request is completed.

2. The method of claim 1, further comprising preventing transmission of the information from the memory location of the system memory to the first caching agent before completion of the snoop processing if it is determined that the directory entry indicates that the information is present in a remote caching agent of the system.

3. The method of claim 1, further comprising sending a snoop broadcast request from the first caching agent to a plurality of caching agents of the system in parallel with the read request to the home agent.

4. The method of claim 3, further comprising receiving a plurality of snoop responses to the snoop broadcast request in the home agent, and completing the snoop processing responsive to the plurality of snoop responses.

5. The method of claim 4, further comprising sending a completion message to the first caching agent after completing the snoop processing so that the read request can be deallocated.

6. The method of claim 1, further comprising receiving a second read request from a second caching agent in the home agent for the same information as the read request from the first caching agent, the second caching agent of a remote node, and updating the directory entry associated with the memory location to indicate that the second caching agent includes a copy of the information.

7. The method of claim 1, further comprising, responsive to the read request, issuing a local snoop request from the home agent to at least one local caching agent, wherein the directory entry does not include status information with respect to the at least one local caching agent.

8. A system comprising:
a first processor including a first caching agent and a first home agent to guard a first local region of a system memory;
a second processor coupled to the first processor via an interconnect having a snoop broadcast protocol, the second processor including a second caching agent and a second home agent to guard a second local region of the system memory, wherein the second home agent is to receive a read request from the first processor, the read request for data stored in the second local region of the system memory, and to send the data to the first processor before snoop processing with respect to the read request is completed if a directory entry associated with the data indicates that a copy of the data is not present in a remote caching agent of the system; and
the system memory coupled to the first processor and the second processor, wherein the system memory is to store the directory entry.

9. The system of claim 8, wherein the second home agent is to update the directory entry associated with the data if the directory entry indicates the data is not present in the remote caching agent.

10. The system of claim 8, wherein the second home agent is to generate a broadcast snoop responsive to the read request and without waiting for access to the directory entry.

11. The system of claim 8, wherein the second home agent is to prevent sending of the data to the first caching agent before completion of the snoop processing if it is determined that the directory entry indicates that the data is present in the remote caching agent.

12. The system of claim 8, wherein the first processor is to send a snoop broadcast request to a plurality of caching agents of the system in parallel with the read request.

13. The system of claim 12, wherein the second home agent is to receive a plurality of snoop responses to the snoop broadcast request, and to complete the snoop processing responsive to the plurality of snoop responses.

14. The system of claim 13, wherein the second home agent is to send a completion message without the data to the first processor after sending the data to the first processor, and responsive to completing the snoop processing.

15. The system of claim 8, further comprising a first counter to store a count of memory requests associated with the first local region, and a second counter to store a count of memory requests associated with the second local region, and wherein the second home agent is to switch a coherence processing protocol from a directory assisted snoop broadcast protocol to a pure snoop broadcast protocol, if the first counter is greater than a threshold level.

16. The system of claim 8, wherein the second home agent is, responsive to the read request, issue a local snoop request from the second home agent to the second caching agent, wherein the directory entry does not include status information with respect to the second caching agent, the directory entry stored in the second local region.

17. A processor comprising:
a first caching agent; and
a first home agent to guard a first local region of a system memory, wherein the first home agent is to receive a read request from the first caching agent, the read request for data stored in the first local region of the system memory to obtain the data from the first local region of the system memory, and to send the data to the first caching agent before snoop processing with respect to the read request is completed, if a directory entry stored in the system memory associated with the data indicates that a copy of the data is not present in a remote caching agent.

18. The processor of claim 17, wherein the first home agent is to update the directory entry associated with the data if the directory entry indicates the data is not present in the remote caching agent.

19. The processor of claim 17, wherein the first home agent is to generate a broadcast snoop responsive to the read request and without waiting for access to the directory entry.

20. The processor of claim 17, wherein the processor includes a plurality of caching agents each corresponding to a core and coupled together via a ring interconnect.

* * * * *